(12) United States Patent
Koudas et al.

(10) Patent No.: US 8,024,346 B2
(45) Date of Patent: *Sep. 20, 2011

(54) METHOD AND APPARATUS FOR RANKED JOIN INDICES

(75) Inventors: Nikolaos Koudas, Springfield, NJ (US); Ioannis Kotidis, Lake Hiawatha, NJ (US); Themistoklis Palpanas, Riverside, CA (US); Divesh Srivastava, Summit, NJ (US); Panayiotis Tsaparas, Toronto (CA)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/647,490

(22) Filed: Dec. 26, 2009

(65) Prior Publication Data

US 2010/0100553 A1    Apr. 22, 2010

Related U.S. Application Data

(63) Continuation of application No. 11/676,470, filed on Feb. 19, 2007, now Pat. No. 7,664,749, and a continuation of application No. 10/775,056, filed on Feb. 9, 2004, now Pat. No. 7,185,012.

(60) Provisional application No. 60/446,237, filed on Feb. 10, 2003.

(51) Int. Cl.
*G06F 17/30* (2006.01)

(52) U.S. Cl. ........ 707/743; 707/741; 707/748; 707/752; 707/E17.002

(58) Field of Classification Search .................. 707/743, 707/741, 748, 752, E17.002, 999.007, 999.002, 707/999.003, 999.2
See application file for complete search history.

(56) References Cited

U.S. PATENT DOCUMENTS

| 5,600,831 | A | * | 2/1997 | Levy et al. ........................ 1/1 |
| 5,949,678 | A | * | 9/1999 | Wold et al. ...................... 700/83 |
| 5,987,468 | A | * | 11/1999 | Singh et al. ........................ 1/1 |
| 6,871,201 | B2 | | 3/2005 | Yu et al. |
| 7,185,012 | B1 | | 2/2007 | Koudas et al. |
| 7,664,749 | B1 | | 2/2010 | Koudas et al. |
| 2003/0061213 | A1 | | 3/2003 | Yu et al. |
| 2004/0002973 | A1 | * | 1/2004 | Chaudhuri et al. ............... 707/7 |

OTHER PUBLICATIONS

Nicholas Bruno, et al., "Top-K Selection Queries Over Relational Database: Mapping Strategies and Performance Evaluation", Jun. 2, 2002, vol. 27, pp. 153-187.
Nicholas Bruno, et al., "Performance of Multiattribute Top-K Queries on Relational Systems", 2000.

* cited by examiner

*Primary Examiner* — Tim T. Vo
*Assistant Examiner* — Shiow-Jy Fan

(57) ABSTRACT

A method and apparatus for ranked join indices includes a solution providing performance guarantees for top-k join queries over two relations, when preprocessing to construct a ranked join index for a specific join condition is permitted. The concepts of ranking join indices presented herein are also applicable in the case of a single relation. In this case, the concepts herein provide a solution to the top-k selection problem with monotone linear functions, having guaranteed worst case search performance for the case of two ranked attributes and arbitrary preference vectors.

20 Claims, 10 Drawing Sheets

(a)

(b)

Example operation of algorithm Construct RJI

| PARTS | | | SUPPLIERS | |
|---|---|---|---|---|
| availability | name | supplier id | supplier id | quality |
| 5 | PO5 | 1 | 1 | 10 |
| 2 | PO5 | 2 | 2 | 3 |
| 9 | PO5 | 3 | 3 | 8 |

Table and Rank Attributes

Figure 1

DominatingSet *(C,K)*
Initialize priority queue $Q$ and $D_K = \emptyset$.
Sort the join result in non-increasing order of the $s_2$ rank value.
For the $i$th tuple $t_i$ with rank values($s_1^i$, $s_2^i$)

if ($|Q| < K$)

include $t_i$ in $D_K$ include $s_1^i$ in $Q$ else
        if $s_1^i \leq \min\{Q\}$ disgard $t_i$
    else
        include $t_i$ in $D_K$ include $s_1^i$ in $Q$ if $|Q| > k$ delete the minimum element of $Q$
Output $D_K$ The Dominating Set Algorithm

Figure 2

Examples of set $D_K$ for different join result

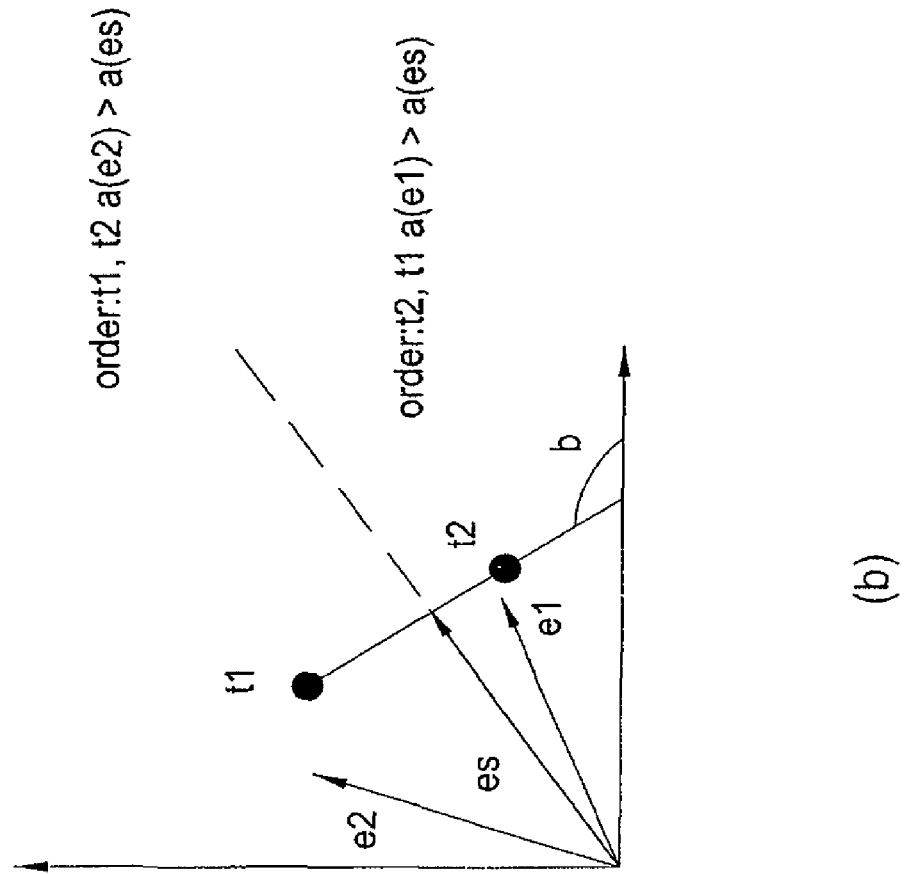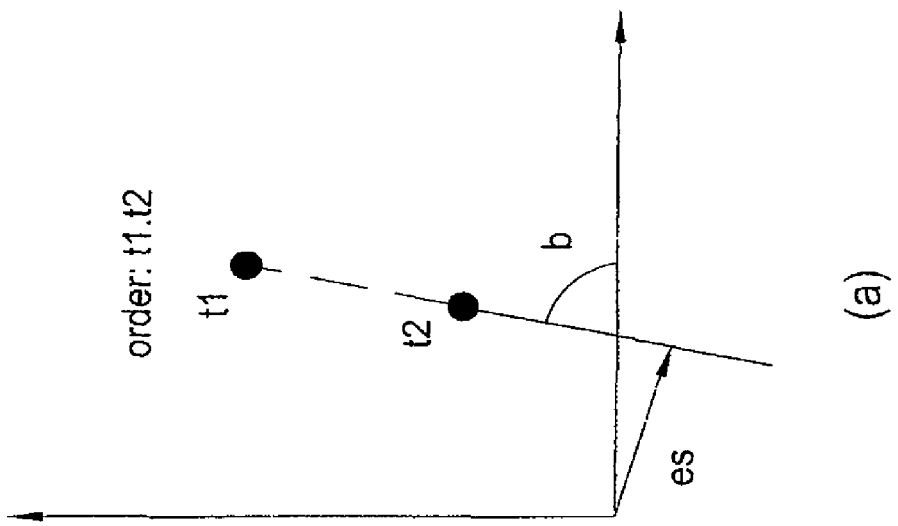
Figure 4

```
ConstructRJI($\mathcal{D}_K$)
For all $(t_i, t_j)$, $t_i, t_j \in \mathcal{D}_K$
    $V \leftarrow$ Compute separating vectors $e_{s_{ij}}$ and separating points $a(e_{s_{ij}})$
Sort $V$ in non-decreasing order of $a(e_{s_{ij}})$
Form $R$ consisting of top-$K$ tuples in $\mathcal{D}_K$ with respect to $f_{(1,0)}$
Set $\ell = 0$; $R_\ell = R$;
For each element $(t_i, t_j)$ of $V$
    if $t_i, t_j \in R$ or $t_i, t_j \notin R$
        No change in $R$'s composition by $e_{s_{ij}}$; discard $e_{s_{ij}}$
    if $t_i \in R$ and $t_j \notin R$
        Materialize $a(e_{s_{ij}})$, $R_\ell$; replace $t_i$ with $t_j$ in $R$;
        $\ell = \ell + 1; R_\ell = R$
    if $t_i \notin R$ and $t_j \in R$
        Materialize $a(e_{s_{ij}})$, $R_\ell$; replace $t_j$ with $t_i$ in $R$;
        $\ell = \ell + 1; R_\ell = R$
When $V$ is exhausted, materialize $R$
```

Algorithm ConstructRJI

Figure 5

Example operation of algorithm Construct RJI

A graphical representation for the Top-KrtreeAnswer algorithm

Input: A number $k$ and a preference vector $e = (p_1, p_2)$.
Output: The answer-set $S$ to the *top-k* query.

```
1  procedure TopKrtreeAnswer()
2      let S = ∅ be a priority queue with space for exactly k values;
3      ProcessRtreeNode(root of rtree, S);
4      return(S);

5  procedure ProcessRtreeNode(node N, S)
6      if (N is a leaf)
7          for (all tuples t in this node)
8              insert t in S;
9      else
10         let r range over all the MBRs in N;
11         let r_max = arg max_r {maximum projection of MBR r
                                    on preference vector e};
12         let r_max^low = {minimum projection of MBR r_max
                              on preference vector e};
13         for (each subtree rooted at each MBR c of N)
14             if (maximum projection of MBR c ≥ r_max^low)
15                 ProcessRtreeNode(c, S);
16     return(S);
```

The Top KrtreeAnswer algorithm

Figure 9

METHOD AND APPARATUS FOR RANKED JOIN INDICES

CROSS-REFERENCES TO RELATED APPLICATIONS

This application is a continuation of U.S. patent application Ser. No. 11/676,470, filed Feb. 19, 2007, now U.S. Pat. No. 7,664,749 currently allowed and is a continuation of U.S. patent application Ser. No. 10/775,056 filed Feb. 9, 2004, now, U.S. Pat. No. 7,185,012, which claims the benefit of U.S. Provisional Application No. 60/446,237, filed Feb. 10, 2003, where all of the above cited applications are herein incorporated by reference in their entirety.

FIELD OF THE INVENTION

The present invention relates generally to the ranking of data entities and, more particularly, to a method and apparatus for ranked join indices.

BACKGROUND OF THE INVENTION

Many data sources contain data entities that may be ordered according to a variety of attributes associated with the entities. Such orderings result effectively in a ranking of the entities according to the values in an attribute domain. Such values may reflect various quantities of interest for the entities, such as physical characteristics, quality, reliability or credibility to name a few. Such attributes are referred to as rank attributes. The domain of rank attributes depends on their semantics. For example, the domain could either consist of categorical values (e.g., service can be excellent, fair or poor) or numerical values (e.g., an interval of continuous values). The existence of rank attributes along with data entities leads to enhanced functionality and query processing capabilities.

Typically, users specify their preferences toward specific attributes. Preferences are expressed in the form of numerical weights, assigned to rank attributes. Query processors incorporate functions that weight attribute values by user preference, deriving scores for individual entities. Several techniques have been developed to perform query processing with the goal of identifying results that optimize such functions. A typical example is a query that seeks to quickly identify k data entities that yield best scores among all entities in the database. At an abstract level, such queries can be considered as generalized forms of selection queries.

Several prior art techniques disclose a framework for preference based query processing. Such works consider realizations of a specific instance of this framework, namely top-k selection queries, that is, quickly identifying k tuples that optimize scores assigned by monotone linear scoring functions on a variety of ranked attributes and user specified preferences. Most of these techniques for answering top-k selection queries, however, are not based on indexing. Instead, they are directed towards optimizing the number of tuples examined in order to identify the answer under various cost models of interest. Such optimizations include minimization of tuples read sequentially from the input or minimization of random disk access.

However, the few available techniques that do disclose indexing for answering top-k selection queries do not provide guarantees for performance and in the worst case, an entire data set has to be examined in order to identify the correct answer to a top-k selection query.

SUMMARY OF THE INVENTION

The inventors disclose herein a technique, referred to by the inventors as ranked join index, for efficiently providing solutions to top-k join queries for arbitrary, user specified preferences and a large class of scoring functions. The rank join index technique of the present invention requires small space (i.e., as compared to an entire join result) and provides performance guarantees. Moreover, the present invention provides a tradeoff between space requirements and worst-case search performance.

In one embodiment of the present invention a method of creating a ranked join index for ordered data entries includes determining a dominating set of the ordered data entries, mapping the dominating set of ordered data entries according to rank attributes, determining a separating vector for each set of adjacent mapped data entries, and ordering and indexing the data entries according to a separating point associated with each of the separating vectors.

BRIEF DESCRIPTION OF THE DRAWINGS

The teaching of the present invention can be readily understood by considering the following detailed description in conjunction with the accompanying drawings, in which:

FIG. 1 depicts two tables each comprising a list of attributes and rankings for the attributes;

FIG. 2 depicts an embodiment of an algorithm for computing the dominating set for substantially any value of K, where K depicts an upper bound for the maximum requested result size of any top-k join query;

FIG. 4a graphically depicts an example of the ordering of two tuples when a vector has a positive slope;

FIG. 4b graphically depicts an example of the ordering of the two tuples for a second case when a vector has an other than positive slope;

FIG. 5 depicts an embodiment of an RJI Construct algorithm of the present invention, which preprocesses a set of tuples and constructs an index on its elements;

FIG. 9 depicts an embodiment of a TopKrtree Answer algorithm of the present invention.

To facilitate understanding, identical reference numerals have been used, where possible, to designate identical elements that are common to the figures.

DETAILED DESCRIPTION

Figure 3:
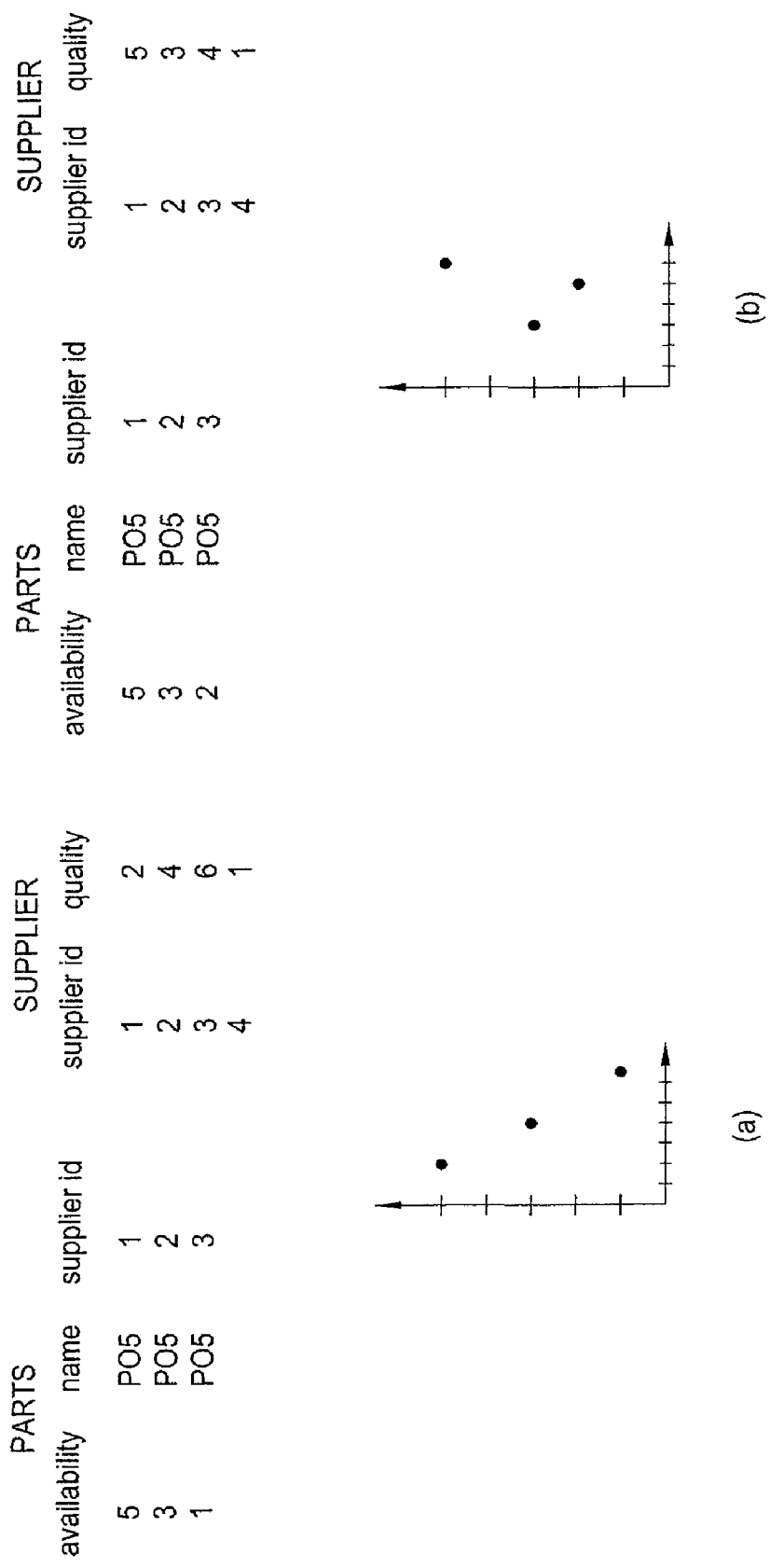
FIGS. 3a and 3b graphically depict an example of a Dominating Set determined by a Dominating set algorithm for tables and rank attributes having different join results.

Although various embodiments of the present invention herein are being described with respect to techniques for providing performance guarantees for top-k join queries over two relations, it will be appreciated by those skilled in the art informed by the teachings of the present invention that the concepts of the present invention may be applied to providing performance guarantees for join queries over substantially any number of relations.

FIG. 1 depicts two tables each comprising a list of attributes and rankings for the attributes. For example, FIG. 1 comprises a first table labeled Parts. The Parts table comprises three attributes, namely; availability, name and supplier id. FIG. 1 further comprises a second table labeled Suppliers. The Suppliers table comprises two attributes, namely; supplier id and quality. For purposes of explanation, it is assumed that all parts correspond to the same piece of a mechanical device, illustratively part P05, possibly of different brands. The rank attributes, availability and quality, determine the availability (i.e., current quantity in stock for this part) and the quality of the supplier (i.e., acquired by, for example, user experience reports on a particular supplier) respectively, having as a domain a subset of R+ (i.e., the greater the value the larger the preference towards that attribute value). A user interested in purchasing parts from suppliers will have to correlate, through a join on supplier id, the two tables. Rank attributes, could provide great flexibility in query specification in such cases. For example, a user looking for a part might be more interested in the availability of the part as opposed to supplier quality. In a similar fashion, supplier quality might be of greater importance to another user, than part availability. It is imperative to capture user interest or preference towards rank attributes spanning multiple tables to support such queries involving user preferences and table join results. User preference towards rank attributes is captured by allowing users to specify numerical values (weights), for each rank attribute (i.e., the larger the weights the greater the preference of the user towards these rank attributes). Assuming the existence of scoring functions that combine user preferences and rank attribute values returning a numerical score, the target queries of the present invention identify the k tuples in the join result of, for example in FIG. 1, Parts and Suppliers with the highest scores.

For example, let R, S depict two relations, with attributes $A_1$-$A_n$ and $B_1$-$B_m$, respectively. A1, B1 are rank attributes with domains a subset of R+ and θ, an arbitrary join condition defined between (sub)sets of the attributes $A_2$-$A_n$, $B_2$-$B_m$ (R⋈$_\theta$S). For a tuple, t∈R⋈$_\theta$S, $A_i$(t) (and similarly $B_i$(t)) corresponds to the value of attribute $A_i$ (and similarly $B_i$) of tuple, t. Furthermore, Let f: R+x R+→R+ be a scoring function that takes as input the pair of rank attribute values $(s_1, s_2)$=$(A_1(t), B_1(t))$ of tuple t∈R⋈$_\theta$S, and produces a score value $f(s_1, s_2)$ for the tuple t. It should be noted that a function f: R+x R+→R+ is monotone if the following holds true: $x_1 \leq x_2$, and $y_1 \leq y_2$, then $f(x_1, y_1) \leq f(x_2, y_2)$.

For further explanation, let e=$(p_1, p_2)$ denote the user defined preferences towards rank attributes $A_1$, $B_1$. As such, a linear scoring function, $f_e$: R+x R+→R+, is defined as a scoring function that maps a pair of score values $(s_i, s_2)$ to the value $f_e(s_1, s_2)$=$p_1 s_1 + p_2 s_2$. It is assumed that user preferences are positive (belonging to R+). This is an intuitive assumption as it provides monotone semantics to preference values (the greater the value the larger the preference towards that attribute value). In such a case, the linear function $f_e$ is monotone as well. The symbol, £, is used to denote the class of monotone linear functions. Note that the pair of user defined preferences, e, uniquely determines a function, f∈£.

Given the relations R, S, join condition θ and scoring function $f_e$∈£, a top-k query returns a collection $T_k(e) \subseteq$ R⋈$_\theta$S of k tuples ordered by $f_e(A_1(t), B_1(t))$, such that for all t∈R⋈$_\theta$S, t∉$T_k(e)$ ⇒ $f_e(A_1(t), B_1(t)) \leq f_e(A_1(t_i), B_1(t_i))$, for all $t_i$∈$T_k(e)$, $1 \leq i \leq k$. Thus, a top-k join query returns as a result k tuples from the join of two relations with the highest scores, for a user specified scoring function, $f_e$, among all tuples in the join result.

If the relations R, S to be joined consist of O(n) tuples, the size of the join relation R⋈$_\theta$S may be as large as $O(n^2)$. The inventors determined and demonstrate herein that most of the tuples of the join relation, R⋈$_\theta$S, are typically not necessary for answering top-k join queries. In particular, for a fixed value K<n, where K depicts an upper bound for the maximum requested result size of any top-k join query, and for the entire class of linear functions £, in the worst case, a number of tuples much smaller than $O(n^2)$ is sufficient to provide the answer to any top-k join query, k≤K.

In addition, it should be noted that there is no need to generate the complete join result R⋈$_\theta$S. For example, let C denote the subset of R⋈$_\theta$S necessary to generate, in the worst case, an index, providing answers with guaranteed performance on any top-k join query, k≤K, issued using any scoring function f∈£. Note that although each tuple, t, of R could join in the worst case with O(n) tuples of S, for a fixed value of K, only t is joined with at most K tuples in S; the ones that have the highest rank values. Therefore, among the possible O(n) tuples in the join that are determined for each tuple, t∈R, only the K tuples with the highest rank values are required. Due to the monotonicity property of functions in £, these K tuples will have the highest scores for any f∈R. As such, the inventors disclose postulate one (1) which follows:

For relations of size O(n) and a value K, the worst case size of C is O(nK).     (1)

Note that this worst case size is query independent (i.e., using the same set of tuples, C, of worst case size O(nK), any top-k join query, k≤K, for substantially any f∈£ may be solved. In a preprocessing step, C may be determined by joining R and S and selecting for each tuple, t∈R, the K (worst case) tuples contributed by t to the join result that have the highest rank values in S. Such a preprocessing step may be carried out in a fully declarative way using a Structured Query Language (SQL) interface, which is well-known in the art.

For further reduction of the size of C, the inventors disclose letting t and t' denote two tuples of R⋈$_\theta$S and $(s_1, s_2)$ and $(s'_1, s'_2)$ denote the pairs of rank values associated with the tuples, respectively. Thus, tuple t' dominates tuple t if $s_1 \leq s'_1$ and $s_2 \leq s'_2$. The domination property provides a basic means to reduce C even further.

As such, two methods of reducing the size of C are disclosed herein. That is, the determination that for relations of size O(n) and a value K, the worst case size of C is O(nK), reduces a join result by restricting the number of the tuples contributed to the join by a single tuple of a relation. In addition the domination property described above reduces the size of C by examining the tuples contributed to the join by multiple tuples of a relation. As such, the inventors disclose postulate two (2) which follows:

For a value of K, if some tuple t∈C is dominated by at least K other tuples, then t cannot be in the solution set of any top-k join query, k≤K.     (2)

Thus, from the monotonicity properties of the scoring functions, it is evident that a viable strategy to reduce the size of C is to identify all tuples in C dominated by at least K tuples. Formally, given a set C, the dominating set, $D_k$, is the minimal subset of C with the following property: for every tuple t∉$D_k$ with rank values $(s_1, s_2)$, there are at least K tuples $t_i$∈$D_k$, that dominate tuple t.

FIG. 2 depicts an embodiment of an algorithm for computing the dominating set, $D_k$ for substantially any value of K in accordance with the present invention. In the algorithm of FIG. 2, every tuple $t_i$ in C is associated with a pair of rank values $(s^i_1, s^i_2)$. The algorithm maintains a priority queue, Q, (supporting insertions/deletions in logarithmic time) storing the K largest $s^i_1$ rank values encountered so far. The algorithm first sorts the tuples in the join result in non-increasing order with respect to the $s^i_2$ rank values. The tuples are then considered one at a time in that order. For every tuple $t_i$ (after the first K), if its $s^i_1$ rank value is less than the minimum rank value present in Q, the tuple is discarded. Otherwise the tuple is included in the dominating set, and the priority queue, Q, is updated. The Algorithm Dominating Set of FIG. 2 requires a time equal to O(|C|log|C|) for sorting and computes the dominating set $D_k$ in a time equal to O(|C|log K). The number of tuples reduced by the Dominating Set algorithm depends on the distribution of the rank value pairs in the join result. In practice the size of $D_k$ is expected to be much smaller than O(nK). In the worst case, however, no tuple is dominated by K other tuples and, as a result, the Dominating Set algorithm does not achieve any additional reduction in the number of tuples.

FIGS. 3a and 3b graphically depict an example of a Dominating Set determined by the Dominating set algorithm for tables and attributes such as those of FIG. 1, having two different join results. FIG. 3 depicts the two pairs of relations and the different rank attribute values. For both pairs of relations, the size of the join result is the same (equal to 3). For the tuples of each join result in FIGS. 3a and 3b, a geometric analogy is drawn and the tuple is represented by the rank attribute pair, (quality, availability), as a point in two dimensional space. For the rank attribute value distributions in FIG. 3a, the set $D_1$ has a size of 3 (worst case) since no tuple is dominated by any other tuple. Thus, in this case the Dominating Set algorithm determines the set $D_1$ having a size equal to the theoretically predicted worst case. In contrast, in FIG. 3b, the Dominating Set algorithm determines a set $D_1$ with a size of 1 and containing the tuple whose rank attribute pair dominates the other two, for K=1.

The relationship among the sets, $D_k$, associated with each top-k join query possible with k≦K may be characterized according to the following postulate, number three (3), which follows:

Considering two top-k join queries requesting $k_1$, $k_2$ results and $k_1 \leq k_2 \leq K$, for the dominating sets $D_{k1}$, $D_{k2}$, $D_K$, then $D_{k1} \subseteq D_{k2} \subseteq D_K$. (3)

Thus, it is determined that it is sufficient to identify and determine only the set $D_K$ since the solutions to any top-k join query k≦K are contained in this set. This also holds true for any scoring function, f∈£.

The inventors present above an algorithm to preprocess the set $D_K$ and develop an index structure, considered by the inventors as RJI, which provides solutions to top-k join queries with guaranteed worst case access time. Every function, f∈£, is completely defined by a pair of preference values ($p_1$, $p_2$). The value of the function, f, on a tuple, t∈$D_K$ with rank values ($s_1$, $s_2$) is equal to $p_1s_s+p_2s_2$. The index structure, RJI, is constructed by representing members of £ and rank value pairs for each t∈$D_K$ as vectors in two-dimensional space. Since every $f_e$∈£ is completely defined by the pair e=($p_1,p_2$), every function, f, may be depicted by the vector e=⟨(0,0)($p_1,p_2$)⟩ on the plane. Similarly, the rank value pairs may be characterized as a vector s=⟨(0,0)($s_1,s_2$)⟩. In light of the preceding geometric relations, the value of a function, f, on a tuple t∈$D_K$ with rank values ($s_1,s_2$) is the inner product of the vectors e and s. The reasoning behind representing members of class of monotone linear functions, £, as vectors may be explained as follows. Assume that ||e||=1 (i.e., the vector, e, is a unit vector), then the value of the function, $f_{(p1,p2)}(s_1,s_2)$, is the length of the projection of the vector s on the vector e. It should be noted, however, that the assumption that the vector, e, is a unit vector is solely for the purposes of simplifying the presentation. It should not be interpreted as being required for the correctness of the approach of the present invention. The result of any top-k join query $T_k$(e) is the same independent of the magnitude of the vector, e. For example, letting u=αe be some vector in the direction of e with length α, $T_k$(e) is the same as $T_k$(u) since the lengths of the projected vectors change only by a scaling factor, and thus, their relative order is not affected.

As previously depicted, the set of tuples $D_K$ may be represented as points in two dimensional-space using the rank values of each tuple. Given a unit vector e, the angle a(e) of the vector is defined as the angle of e with the axis representing (without loss of generality) the $s_1$ rank values. For a set of l tuples $\{t_1, t_2, \ldots, t_l\}$, $Ord_e(\{t_1, t_2, \ldots, t_l\})$ is defined as the ordering of the tuples $\{t_1, t_2, \ldots, t_l\}$ when the rank value pairs associated with each tuple are projected on the vector e, and are sorted by non-increasing order of their projection lengths. $\overline{Ord_e}(\{t_1, t_2, \ldots, t_l\})$ is used to denote the reverse of that ordering. $T_k$(e) contains the top k tuples in the ordering $Ord_e(\{t_1, t_2, \ldots, t_l\})$.

Let the vector, e, sweep the plane defined by the domains of rank attributes (R+x R+). Specifically, let the sweep start from the $s_1$-axis and move towards the $s_2$-axis (i.e., counter-clockwise). Thus, e ranges from e=⟨(0,0)(1,0)⟩ to e=⟨(0,0),(0,1)⟩. As such, to examine how the ordering $Ord_e(D_K)$ varies as e sweeps the plane, two tuples and their relative order are first considered. That is, let $s_1=(s_1^1, s_2^1)$ and $s_2=(s_1^2, s_2^2)$ be the rank value pairs for two tuples $t_1$, $t_2$∈$D_K$. Since rank value pairs are represented as vectors, let $\langle s^1, s^2 \rangle = s^2-s^1$ denote the vector defined by the difference of $s^2$ and $s^1$, and let b denote the angle of the vector $\langle s^1, s^2 \rangle$ with the $s_1$-axis. Having done so, the inventors disclose postulate four (4), which follows:

Depending on the angle, b, that vector $\langle s^1, s^2 \rangle$ forms with the $s_1$-axis as e sweeps the plane, one of the following holds true:
(a) if b∈[0, π/2], $Ord_e(\{t_1, t_2\})$ is the same for all e.
(b) if b∈[−π/2, 0] U [π/2, π], let $e_s$ be the vector perpendicular to $\langle s^1,s^2 \rangle$, and as such:
  (i) $f_{e_s}(s_1^1,s_2^1)=f_{e_s}(s_1^2, s_2^2)$,
  (ii) $Ord_{e_1}(\{t_1, t_2\})=Ord_{e_2}(\{t_1, t_2\})$, for all vectors $e_1,e_2$ with a($e_1$), a($e_2$)>a($e_s$), or a($e_1$), a($e_2$)<a($e_s$),
  (iii) $Ord_{e_1}(\{t_1, t_2\})=\overline{Ord}_{e_2}(\{t_1, t_2\})$, for all $e_1,e_2$, such that a($e_1$)<a($e_s$)<a($e_2$). Moreover, as a vector e sweeps the positive quadrant, tuples $t_1$, $t_2$ are adjacent in the ordering $Ord_e(D_K)$ immediately before e crosses vector $e_s$, and remain adjacent in $Ord_e(D_K)$ immediately after e crosses vector $e_s$.

The principles presented above indicate that as e sweeps a plane, the ordering of tuples $t_1$ and $t_2$ changes only when e crosses the vector $e_s$, which is defined as the vector perpendicular to $\langle s^1, s^2 \rangle$. If the vector $\langle s^1, s^2 \rangle$ has a positive slope, then the ordering of the tuples $t_1$, $t_2$ remains the same for all e. The vector $e_s$ is considered the separating vector of tuples $t_1$ and $t_2$, and a($e_s$) is considered the separating point.

FIG. 4a and FIG. 4b depict a graphical representation of the ordering of two tuples for two different values of the angle, b, that the vector $\langle s^1, s^2 \rangle$ forms with the $s_1$-axis as e sweeps the plane. In FIG. 4a and FIG. 4b two tuples, $t_1$ and $t_2$ are graphed along with a representation of the separating vector, $e_s$, of the tuples, t1 and $t_2$ and a graphical representation of the angle, b. More specifically, FIG. 4a graphically depicts an example of the ordering of two tuples $t_1$, $t_2$ when the vector $\langle s^1, s^2 \rangle$ has a positive slope. As evident in FIG. 4a, the ordering of the tuples $t_1$, $t_2$ remains the same for all e. FIG. 4b graphically depicts an example of the ordering of the two tuples $t_1$, $t_2$ for the second case above where the vector $\langle s^1, s^2 \rangle$ has an otherthan-positive slope. Although only two tuples, $t_1$ and $t_2$ are depicted in FIG. 4a and FIG. 4b, it should be noted that more than two tuples may share the same separating vector. For example, if $t_1$, $t_2$ and $t_3$ are three tuples such that their corresponding rank value pairs are co-linear, the three tuples $t_1$, $t_2$ and $t_3$ all share the same separating vector. As such, the inventors disclose postulate five (5), which follows:

If $t_1, t_2 \ldots t_l$ are $l$ tuples with colinear rank value pairs sharing the same separating vector, $e_s$, then $\text{Ord}_{e1}(\{t_1, t_2 \ldots t_l\}) = \text{Ord}_{e2}(\{t_1, t_2, t_l\})$ for all $a(e_1)$, $a(e_2)$ such that $a(e_1) < a(e_s) < a(e_2)$. (5)

Briefly stated, each separating vector corresponds to the reversal of two or more adjacent points.

FIG. 5 depicts an embodiment of an RJI Construct algorithm in accordance with the present invention, which preprocesses the set of tuples, $D_K$, and constructs an index on its elements. In the algorithm of FIG. 5, a vector, e, sweeps the plane and the composition of $T_K(e)$ is monitored. Every time vector e crosses a separating vector, $\text{Ord}_e(D_K)$ changes by swapping two (or more if they are colinear) adjacent tuples as described above. A key observation is that this swap is of interest for indexing purposes only if it causes the composition of $T_K(e)$ to change. Assuming that $D_K$ contains tuples of the form $(tid_i, s_1{}^i, s_2{}^i)$, where $tid_i$ is a tuple identifier, and $s_1{}^1$, $s_2{}^i$ are the associated rank values, the algorithm of FIG. 5 initiates by first computing the set V of all separating vectors. This involves considering each pair of tuples in $D_K$ and computing their separating vector and the associated separating point. Let $e_{si}(a(e_{si}))$ represent the separating vector (separating point) for each pair of tuples, $t_i$, $t_j$, $1 \leq$, $j \leq |D_K|$. Each pair $(tid_i, tid_y)$ along with the associated separating point $a(e_{si})$, is computed and materialized as set V. Then set V is sorted in non-decreasing order of $a(e_{si})$.

The algorithm then sweeps the (positive quadrant of the) plane, going through the separating vectors in V in sorted order. The algorithm maintains also a set, R, that stores (unsorted) the K tuples with highest score according to the function, $f_e$, where e is the current position of the sweeping vector. R is initialized to hold the top-k tuples with respect to the initial position of vector, e, namely $e = \langle (0, 0)(1, 0) \rangle$ (function $f_{(1,0)}$). Initializing R is easy, since the set, $D_K$, computed at the end of the Dominating Set algorithm is sorted by $s_1{}^i$.

Each $a(e_{si})$ in the set, V, (and the corresponding vector $e_{si}$) is associated with two tuple identifiers ($t_i$, $t_j$). When e crosses the vector $e_{si}$ during the sweep, it causes the ordering of tuples $t_i$, $t_j$ to change according to Postulates 4 and 5 depicted above. In case both tuple identifiers belong to R, or neither belongs to R, the vector $e_{si}$, can be safely discarded from consideration, since it does not affect the composition of R. Otherwise, $a(e_{si})$ is determined together with the composition of R, and R is updated to reflect the new tuple identifiers. The last value of R is also determined after the sweep is completed. At the end of the RJI Construct algorithm, M separating vectors, $e_1$, $e_2$, . . . , $e_M$ have been accumulated (represented by their separating points $a(e_i)$, $1 \leq i \leq M$). The accumulation of the vectors, $e_i$ $1 \leq i \leq M$, partitions the quadrant into M+1 regions. Each region i, $0 \leq i \leq M$, is defined by vectors $e_i$, $e_{i+1}$, where $e_0 = \langle (0,0)(1,0) \rangle$ and $e_{M+1} \langle (0,0)(0,1) \rangle$. Region i is associated with a set of K points $R_i \subseteq D_K$, such that for any vector, e, with $a(e_i) \leq a(e) \leq a(e_{i+1})$, uniquely identifying a function $f_e \epsilon \pounds$, $T_K(e)$ is equal to a permutation of $R_i$. This permutation is derived by evaluating $f_e$ on every element of $R_i$ and then sorting the result in non-increasing order. That is, $R_i$ contains (up to a permutation) the answer to any top-k query, $k \leq K$ for any function defined by a vector in region i.

Figure 6:
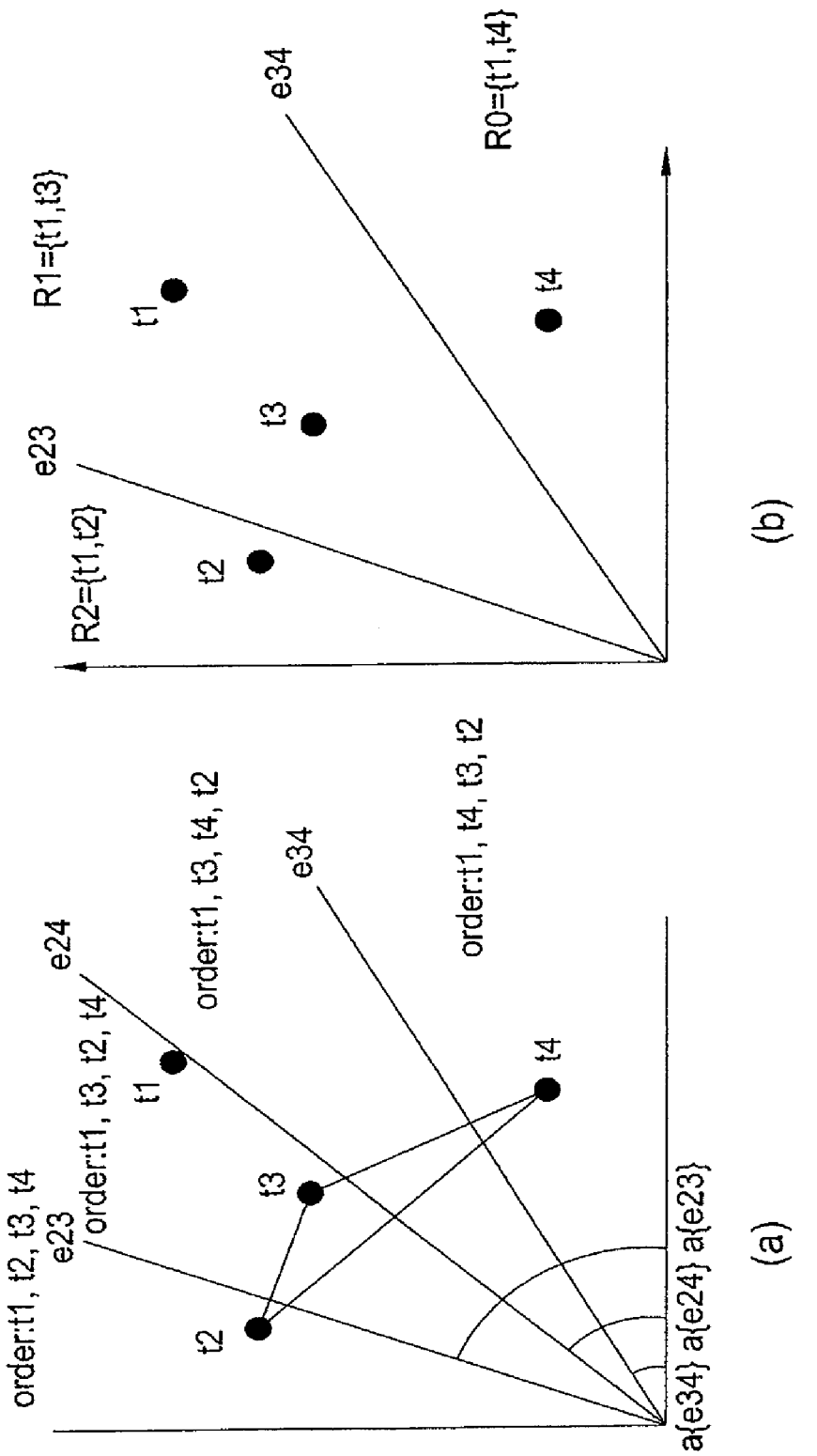
FIG. 6a and FIG. 6b graphically depict an example of the operation of the RJI Construct algorithm.

For example, FIG. 6a and FIG. 6b graphically depict an example of the operation of the RJI Construct algorithm. FIG. 6a and FIG. 6b comprise a set, $D_2$, consisting of four tuples, $t_1$, $t_2$, $t_3$, $t_a$. The RJI Construct algorithm starts by computing the separating vector for each pair of tuples. For ease of explanation and brevity, in FIG. 6a the separating vectors are presented only for pairs of tuples $t_2$, $t_3$, $t_4$. The separating vectors $e_{34}$, $e_{24}$, and $e_{23}$ are computed for each pair as shown in FIG. 6a. Each pair is stored along with the associated separating point and the collection is ordered based on separating points. Setting K=2, an index is created answering the top-1 and top-2 join queries.

Consider now a vector, e, sweeping the plane. The first two tuples in $\text{Ord}_{(1,0)}(D_2)$ are $R = \{t_1, t_4\}$. The first vector crossed by e is $e_{34}$, which corresponds to swapping tuples $t_3$ and $t_4$. The swap changes the composition of R. In particular, $t_4$ is replaced with $t_3$. At this point, $a(e_{34})$ is stored along with the $R_0 = R = \{t_1, t_4\}$ and the current composition of R becomes $R = \{t_1, t_3\}$. Then $a(e_{24})$ is encountered in the sorted order but the swap of $t_2, t_4$ does not affect the composition of R. The next vector in the sorted order is $e_{23}$. The composition of R is affected such that $a(e_{23})$ is stored along with $R_1 = R = \{t_1, t_3\}$ and the current composition of R changes to $R = \{t_1, t_2\}$. When the input is exhausted, the current ordering $R_2 = R = \{t_1, t_2\}$ is stored, and the algorithm terminates. FIG. 6b depicts the final partitioning of the plane.

Critical to the size of the index is the size of M, the number of separating vectors identified by the RJI Construct algorithm. A worst case bound is provided on M by bounding the number of times that a tuple identifier can move from position K+1 to position K in $\text{Ord}_e(D_K)$. Postulates 4, 5 previously presented guarantee that whenever a swap happens between elements of $\text{Ord}_e(D_K)$, it takes place between two adjacent elements in $\text{Ord}_e(D_K)$. Thus, only the separating vectors that cause a swap of the elements in positions K and K+1 in $\text{Ord}_e(D_K)$ are indexed, since these are the ones that cause the composition of T to change. For every $t_i \epsilon D_K$ define $\text{rank}_{ti}(e)$ to be the position of tuple $t_i$ in the ordering $\text{Ord}_e(D_K)$. As such, the inventors disclose postulate six (6), which follows:

For every tuple $t_i$, $\epsilon D_K$, $\text{rank}_{ti}(e)$ can change from $l+1$ to $l$ at most $l$ times for any vector $e$, $l \leq K$. (6)

In addition, the inventors disclose the following Theorem:
Given a set of dominating points $D_K$, an index may be constructed for top-k join queries in time $O(|D_K|^2 \log|D_K|)$ using space $O(|D_K|K^2)$ providing answers to top-k join queries in time $O(\log|KD_K|+K \log K)$, $k \leq K$ in the worst case.

Postulate 6 guarantees that each element in DK contributes at most K changes to $T_K(e)$. This means that each tuple introduces at most K separating vectors and consequently introduces K separating points that need to be stored in the worst case. Therefore, the number M of separating points is at most $O(|D_K|K)$. After the separating points $a(e_s)$ are identified, they are organized along with the associated sets $R_i$ in a B-tree indexed by $a(e_s)$. The leaf level stores pointers to the sets $R_i$. Thus, the total space requirement becomes $O(|D_K|K^2)$. There are $O(nK)$ elements in $D_K$ in the worst case, so the number M of separating points that require representation in the index is at most $O(nK^2)$. Thus, the total space used by this structure in the worst case is $O(nK^3)$. The worst case time complexity for constructing the ranked join index is $O(n^2K^2)$ time to compute the separating vectors and separating points and $O(n^2K^2 \log(n^2K^2))$ time to sort the separating points. Constructing a B-tree may be performed during the single scan on the sorted separating point collection of the RJI Construct algorithm. Thus, the total construction time is $O(n^2K^2 \log(n^2K^2))$. It should be noted that these are the worst case space and construction time requirements for the index RJI.

At query time, given the vector, e, that defines a function, $f_e \in £$, a(e) is computed and the B-tree is searched using a(e) as a key. This effectively identifies the region that contains the vector, e. Then, the associated set R1 is retrieved and $f_e$ evaluated for all elements of $R_i$, sorting the results to produce $T_K(e)$. Thus, the query time is $O(\log(nK^2)+K \log K)$ in the worst case, for any top-k join query, $k \leq K$.

The ranked join index design of the present invention provides a variety of space-time tradeoffs which can be utilized to better serve the performance/space constraints in various settings. If the space is a critical resource, the space requirements could be decreased significantly, at almost no expense on query time. Note that sets $R_i$ and $R_{i+1}$ associated with two neighboring regions differ, in the worst case, by only one tuple. Therefore, the set $R_i \cup R_{i+1}$ contains K+1 distinct tuples. If m regions are merged, then the resulting region contains at most K+m−1 distinct tuples. It should be noted that this is a worst case bound. Depending on the distribution, a region may contain less than K+m−1 distinct tuples. Therefore, if there are initially M separating vectors, merging every m regions reduces the number of separating vectors to M/m. The space for the index becomes $O(M(K+m)/m)$, and the query time $O(\log(M/m)+(K+m)\log(K+m))$. Since $M=O(nK^2)$ in the worst case, the requirements of the index are $O(nK^2(K+m)/m)$ for space, and $O(\log(nK^2/m)+(K+m)\log(K+m))$ for query time.

Figure 7:
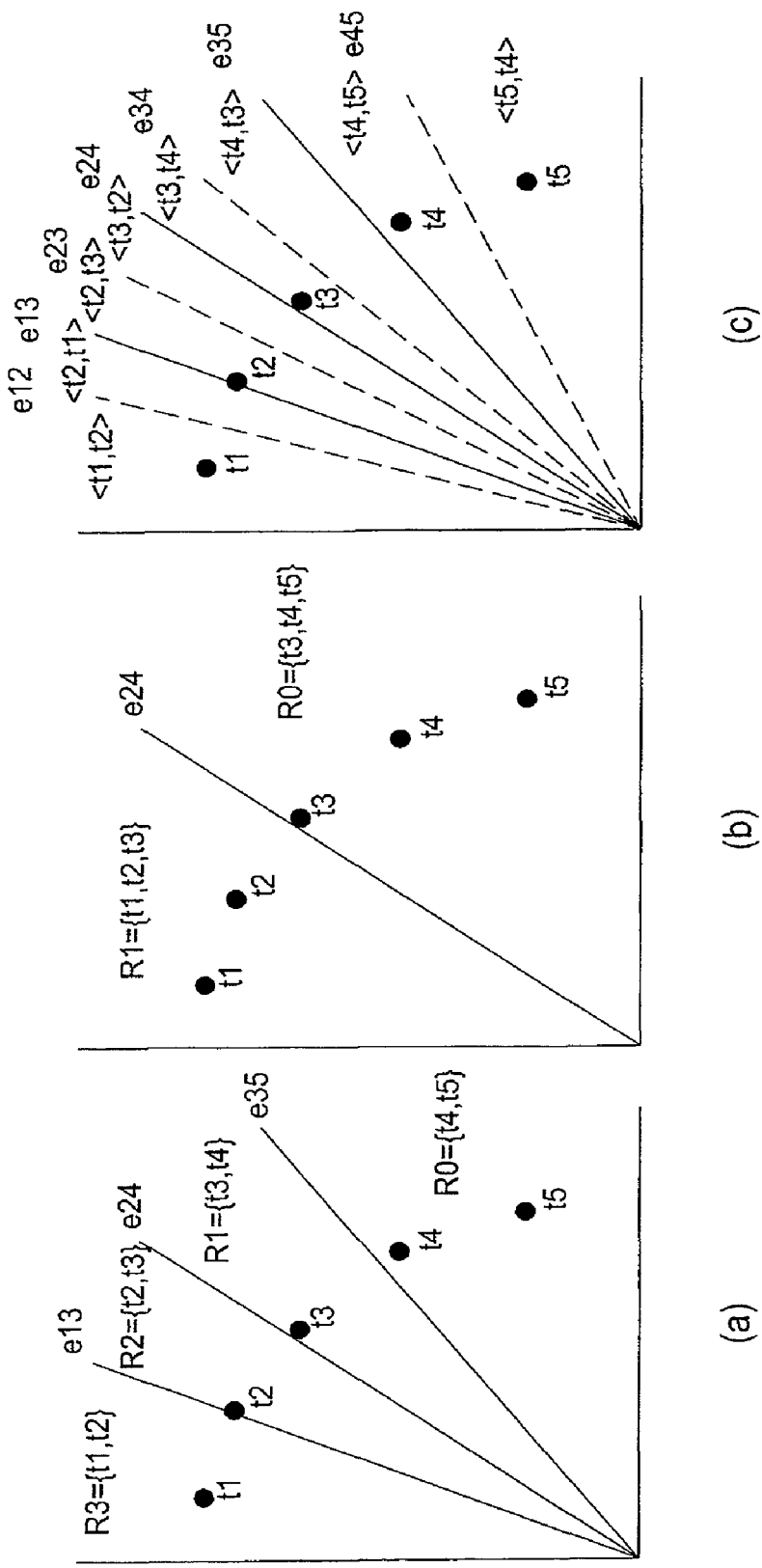
FIGS. 7a, 7b and 7c graphically depict an example of the space-time tradeoffs of the RJI Construct algorithm of FIG. 5.

For example, FIGS. 7a, 7b and 7c graphically depict an example of the space-time tradeoffs of the RJI Construct algorithm for K=2. Every two regions of FIG. 7a are merged and the result is depicted in FIG. 7b. Merging m regions does not always result in a region with K+m−1 tuples as described above. Depending on the distribution of the rank values, it may be the case that as the vectors that define the m regions are crossed, some points move in and out of the top K positions multiple times. In this case, merging m regions results in a region with far less than K+m−1 distinct tuples. As such, instead of merging every m regions, the regions may be merged so that every region (except possibly the last one) contains exactly K+m−1 distinct tuples. This allows for more aggressive reduction of space, without affecting the worst case query time. If fast query time is the main concern, the query time may be reduced by storing all separating vectors that cause $T_K(e)$ to change. According to Postulate 6 described above, a tuple may move from position l+1 to 1 at most l times, therefore, each tuple may contribute at most $1+2+ \ldots +K=K(K\pm1)/2$ changes to $T_K(e)$. Thus, storing at most $O(nK^3)$ separating vectors the query time may be reduced to $O(\log(nK^3))$. Effectively in this case an ordered sequence of points is being stored in each region $R_i$ so there is no need for evaluating $f_e$, on the elements of the region. The ordered sequence (according to $f_e$) may be returned immediately. FIG. 7c depicts a materialization of the separating points causing a change in ordering for the tuples in each region of FIG. 7a.

The inventors further disclose herein a variant of a range search procedure of an R-tree index that is specifically designed to answer top-k join queries. This provides a base-case for performance comparison against a solution provided by the present invention. Briefly stated, an R-tree index is implemented to prune away a large fraction of the tuples that are bound not to be among the top k. This modified R-tree is referred to by the inventors as the TopKrtree. Consider the two-dimensional space defined by the 2 rank values associated with each tuple in $D_K$ returned by the Dominating Set algorithm. An R-tree on these points is constructed using R-tree construction algorithms know in the art. A basic observation is that due to the monotonicity property of the functions $f \in £$, given a Minimum Bounding Rectangle (MBR), r, at any level in that tree, the minimum and maximum score values for all tuples inside r are bounded by the value any scoring function in £ gets at the lower left and upper right corners of r. Following this observation the R-tree search procedure is modified according to the following.

At each node in the R-tree, instead of searching for overlaps between MBRs, the procedure searches for overlaps between the intervals defined by the values of the scoring function in the upper right and lower left corners of the MBRs. The algorithm recursively searches the R-tree and maintains a priority queue collecting k results.

Figure 8:
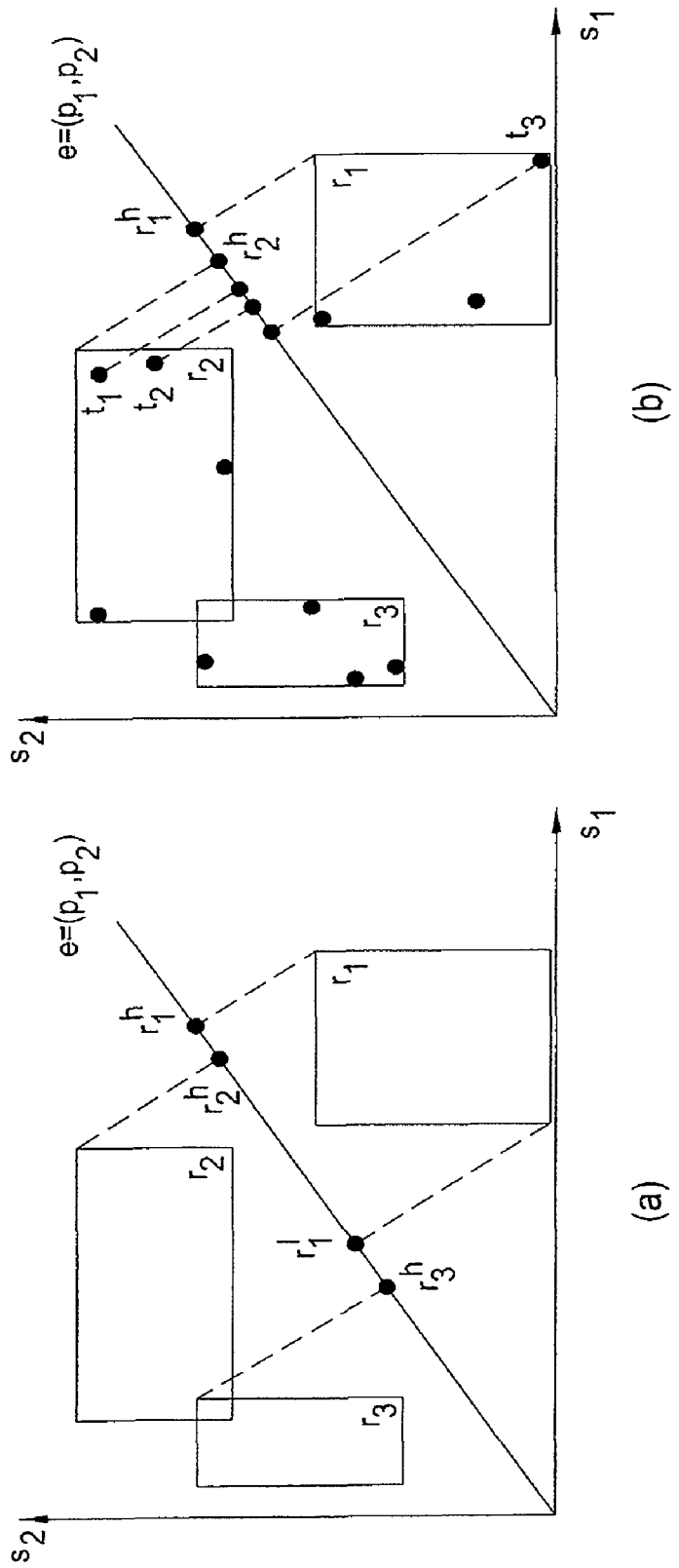
FIG. 8a and FIG. 8b graphically depict an embodiment of an R-tree with three MBRs and a top-k join query.

For example, FIG. 8a and FIG. 8b graphically depict an embodiment of an R-tree with three MBRs, namely $r_1$, $r_2$, and $r_3$, and a top-k join query with $e=(p_1,p_2)$. The largest score that a point in an MBR can possibly achieve is the score given by the projection of the upper right corner of the MBR on vector e. This projection is referred to by the inventors as the maximum-projection for the MBR, and the MBR that has the largest maximum-projection among all the MBRs of the same R-tree node as the master MBR. Similarly, the lowest score is given by the projection of the lower left corner (minimum-projection) of the MBR. A simplified embodiment of the algorithm, named TopKrtree Answer, is presented in FIG. 9. For brevity, it is assumed that each MBR contains at least K tuples. Therefore, the algorithm guiding the search uses only the master MBR at each R-tree level. Accounting for the case where multiple MBR's are required is immediate by maintaining a list of candidate MBRs ordered by their maximum projections at each level. This resembles the type of search performed while answering nearest-neighbor queries using R-trees. In the TopKrtree Answer algorithm of FIG. 9, the MBR with the largest maximum-projection is always the candidate to search and expand further for obtaining the answer to the top-k query. This is rectangle $r_1$ in FIG. 8a, since its maximum-projection $r_1^h$ is the largest among the three MBRs. In this case, all MBRs with maximum-projection less than the minimum-projection of the master MBR may be safely pruned away. In this example the tuples in $r_3$ will not be examined since all these tuples have scores less than the minimum score of all the tuples in $r_1$. However, the algorithm will examine all MBRs with maximum-projection greater than the minimum-projection of the master MBR. The range of projections of such MBRs overlap, and the answer to the top-k query may be a collection of tuples coming from all those MBRs. Therefore, in order to get the correct answer, all of the MBRs whose projections on vector e overlap with the projection of the master MBR must be examined. It should be noted, however, that there are many cases in which the Top-Krtree accesses more MBRs than really necessary. For example, FIG. 8b, depicts a top-2 query with $e=(p_1, p_2)$. Evidently, the answer to this query is the set of tuples $\{t_1, t_2\}$, both contained in $r_2$. Observe that even though $r_1$ has the largest maximum-projection (e.g., $r_1''$) none of its tuples (e.g., $t_3$) are contained in the top-2 answer. Thus, all the computations involving $r_1$ are useless in this case.

Figure 10:
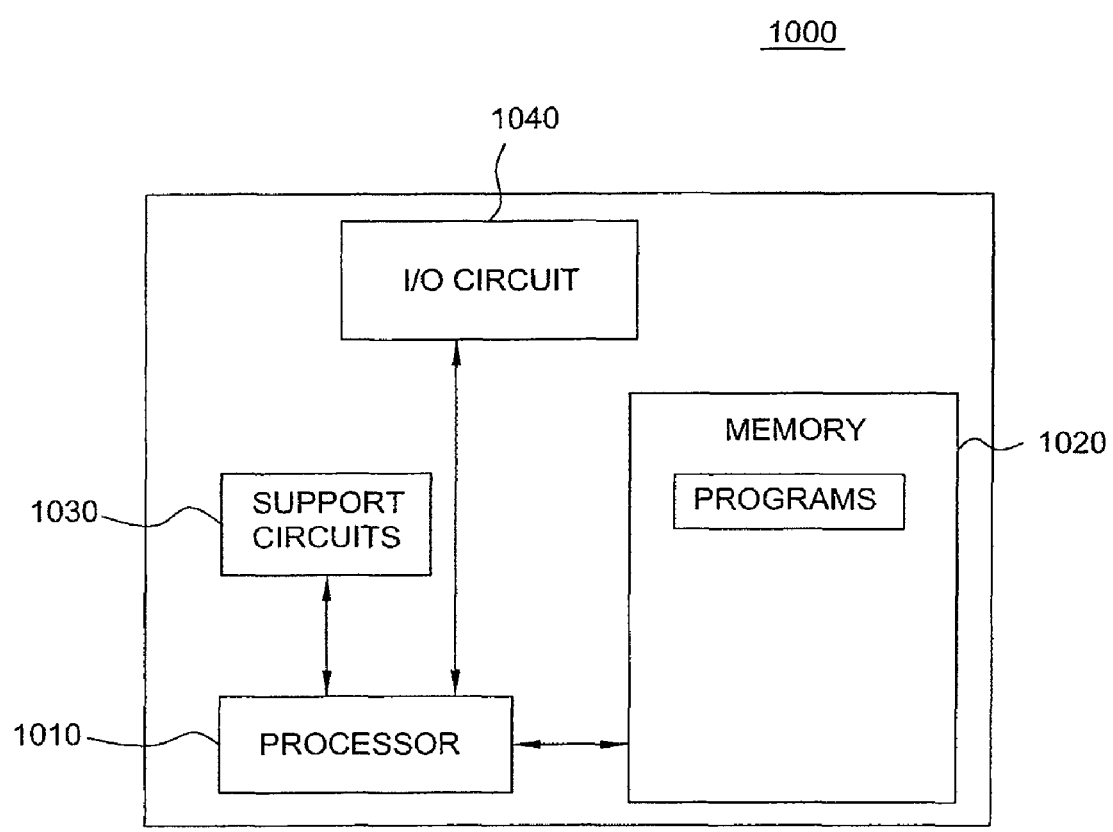
FIG. 10 depicts a high level block diagram of an embodiment of a controller suitable for performing the methods of the present invention.

FIG. 10 depicts a high level block diagram of an embodiment of a controller suitable for performing the methods (i.e., algorithms) of the present invention. The controller 1000 of FIG. 10 comprises a processor 1010 as well as a memory 1020 for storing the algorithms and programs of the present invention. The processor 1010 cooperates with conventional support circuitry 1030 such as power supplies, clock circuits, cache memory and the like as well as circuits that assist in executing the software routines stored in the memory 1020. As such, it is contemplated that some of the process steps discussed herein as software processes may be implemented within hardware, for example, as circuitry that cooperates with the processor 1010 to perform various steps. The controller 1000 also contains input-output circuitry 1040 that forms an interface between the various functional elements communicating with the controller 1000.

Although the controller 1000 of FIG. 10 is depicted as a general purpose computer that is programmed to perform various methods and operations in accordance with the present invention, the invention may be implemented in hardware, for example, as an application specified integrated circuit (ASIC). As such, the process steps described herein are intended to be broadly interpreted as being equivalently performed by software, hardware, or a combination thereof.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A method of creating a ranked join index for ordered data entries, comprising:
   mapping a dominating set of the ordered data entries according to rank attributes;
   determining a separating vector for each set of adjacent mapped data entries of the dominating set of ordered data entries; and
   ordering the ordered data entries according to a separating point associated with each of the separating vectors, wherein the ordering is performed by a processor.

2. The method of claim 1, wherein the ordering the ordered data entries, comprises:
   sweeping a vector across a plane of the adjacent mapped data entries, wherein each time the vector crosses a separating vector, a current composition of highest ranked data entries changes by swapping a data entry in a respective set of the adjacent mapped data entries if it causes a change in the index; and
   wherein each time a data entry in a respective set of adjacent mapped data entries is swapped, the highest ranked data entries are materialized and a new index entry is initiated.

3. The method of claim 1, wherein the ordering is query independent such that any user preference query is resolved using the index.

4. The method of claim 1, wherein each set of adjacent mapped data entries comprises more than two mapped data entries of the ordered data entries if the more than two data entries are collinear.

5. The method of claim 1, further comprising:
   providing a performance guarantee for an amount of time the index requires for resolving user queries.

6. The method of claim 1, further comprising merging ordered data entries.

7. The method of claim 6, wherein said merging results in a storage space requirement for said index that is characterized according to an equation:

$$O(nK^2(K+m)/m)$$

wherein n represents a total number of data entries to be indexed, K represents an upper bound on a number of high ranking data entries that is requested by a user, and m represents a total number of data entries to be merged.

8. The method of claim 6, wherein the merging results in a query time for the index that is characterized according to an equation:

$$O(\log(nK^2/m)+(K+m)\log(K+m))$$

wherein n represents a total number of data entries to be indexed, K represents an upper bound on a number of high ranking data entries that is requested by a user, and m represents a total number of data entries to be merged.

9. The method of claim 6, wherein the merging the ordered data entries provides a space and time tradeoff.

10. The method of claim 9, wherein the space and time tradeoff comprises reducing a query time of the index by increasing a storage space of the index.

11. The method of claim 9, wherein the space and time tradeoff comprises reducing a storage space required by the index by increasing a query time of the index.

12. A method of providing solutions to top-k join queries of ranked data entries for user specified preferences, comprising:
   mapping a dominating set of the ranked data entries according to rank attributes;
   creating a ranked join index for the ranked data entries by determining a separating vector for each set of adjacent mapped data entries of the dominating set of ranked data entries;
   ordering the ranked data entries according to a separating point associated with each of the separating vectors, wherein the ordering is performed by a processor; and
   providing a solution for a user preference query using the ranked join index.

13. A non-transitory computer-readable medium storing a set of instructions, which when executed by a processor, perform a method of creating a ranked join index for ordered data entries, comprising:
   mapping a dominating set of the ordered data entries according to rank attributes;
   determining a separating vector for each set of adjacent mapped data entries of the dominating set of ordered data entries; and
   ordering the ordered data entries according to a separating point associated with each of the separating vectors.

14. The non-transitory computer-readable medium of claim 13, wherein the ordering the ordered data entries, comprises:
   sweeping a vector across a plane of the adjacent mapped data entries, wherein each time the vector crosses a separating vector, a current composition of highest ranked data entries changes by swapping a data entry in a respective set of the adjacent mapped data entries if it causes a change in the index; and
   wherein each time a data entry in a respective set of adjacent mapped data entries is swapped, the highest ranked data entries are materialized and a new index entry is initiated.

15. The non-transitory computer-readable medium of claim 13, wherein the ordering is query independent such that any user preference query is resolved using the index.

16. The non-transitory computer-readable medium of claim 13, wherein each set of adjacent mapped data entries comprises more than two mapped data entries of the ordered data entries if the more than two data entries are collinear.

17. The non-transitory computer-readable medium of claim 13, wherein performance guarantees are provided for an amount of time the index requires for resolving user queries.

18. The non-transitory computer-readable medium of claim 13, further comprising merging ordered data entries.

19. The non-transitory computer-readable medium of claim 18, wherein the merging results in a storage space requirement for the index that is characterized according to an equation:

$$O(nK^2(K+m)/m)$$

wherein n represents a total number of data entries to be indexed, K represents an upper bound on a number of high ranking data entries that is requested by a user, and m represents a total number of data entries to be merged.

20. The non-transitory computer-readable medium of claim 18, wherein the merging results in a query time for the index that is characterized according to an equation:

$$O(\log(nK^2/m)+(K+m)\log(K+m))$$

wherein n represents a total number of data entries to be indexed, K represents an upper bound on a number of high ranking data entries that is requested by a user, and m represents a total number of data entries to be merged.

* * * * *